(12) United States Patent
Shih et al.

(10) Patent No.: US 11,353,055 B2
(45) Date of Patent: Jun. 7, 2022

(54) FIXING STRUCTURE CONFIGURED TO FIX A SCREW

(71) Applicants: INVENTEC (PUDONG) TECHNOLOGY CORPORATION, Shanghai (CN); INVENTEC CORPORATION, Taipei (TW)

(72) Inventors: Ming-Hung Shih, Taipei (TW); Hong-Jie Jian, Taipei (TW); Kuo En Chang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 281 days.

(21) Appl. No.: 16/683,955

(22) Filed: Nov. 14, 2019

(65) Prior Publication Data
US 2021/0071706 A1 Mar. 11, 2021

(30) Foreign Application Priority Data
Sep. 5, 2019 (CN) .......................... 201910836304.4

(51) Int. Cl.
 F16B 41/00 (2006.01)
 F16B 39/284 (2006.01)
 F16B 37/04 (2006.01)
 G06F 1/18 (2006.01)

(52) U.S. Cl.
 CPC .......... *F16B 39/284* (2013.01); *F16B 37/046* (2013.01); *G06F 1/183* (2013.01)

(58) Field of Classification Search
 CPC .... F16B 41/002; F16B 37/045; F16B 37/046; F16B 39/284
 USPC .................................................. 411/999, 104
 See application file for complete search history.

(56) References Cited

U.S. PATENT DOCUMENTS

| | | | | |
|---|---|---|---|---|
| 4,422,276 A | * | 12/1983 | Paravano | B60R 13/0206 411/104 |
| 4,550,230 A | * | 10/1985 | Johnson | H04R 1/023 181/199 |
| 5,839,173 A | * | 11/1998 | Otrusina | A45F 5/02 24/595.1 |
| 6,004,065 A | * | 12/1999 | Higdon | A47B 13/003 108/108 |

(Continued)

*Primary Examiner* — Flemming Saether
(74) *Attorney, Agent, or Firm* — Maschoff Brennan

(57) ABSTRACT

A fixing structure, configured to fix screw. Screw includes wide portion and narrow portion. Fixing structure includes plate part, holding component and elastic positioning component. Plate part includes top surface, bottom surface and mount groove. Mount groove penetrates through top surface and bottom surface and narrow portion is disposed through mount groove to allow wide portion to rest on top surface. Holding component and top surface together form space. Elastic positioning component is disposed on plate part. When wide portion is located in space and between holding component and top surface, and elastic positioning component is in holding state and located at side of wide portion, wide portion is prevented from being moved away from space. When elastic positioning component is switched to released state, elastic positioning component is removed from side of wide portion so that wide portion is allowed to move away from space.

10 Claims, 9 Drawing Sheets

(56) References Cited

U.S. PATENT DOCUMENTS

| | | | | |
|---|---|---|---|---|
| 6,196,758 B1 * | 3/2001 | Scarborough | ........... | F16B 21/09 403/109.3 |
| 6,594,870 B1 * | 7/2003 | Lambrecht | ............ | F16B 5/0628 24/297 |
| 6,796,760 B1 * | 9/2004 | Tanner | .................. | F16B 41/002 411/104 |
| 7,189,043 B2 * | 3/2007 | Benoit | .................. | F16B 41/002 24/669 |
| 7,413,371 B2 * | 8/2008 | Arnold | .................. | F16B 41/002 403/353 |
| 10,259,365 B2 * | 4/2019 | Warju, II | ................ | F16B 2/241 |
| 2007/0107174 A1 * | 5/2007 | Bordas | ................. | F16B 21/065 24/664 |

* cited by examiner

FIXING STRUCTURE CONFIGURED TO FIX A SCREW

CROSS-REFERENCE TO RELATED APPLICATIONS

This non-provisional application claims priority under 35 U.S.C. § 119(a) on Patent Application No(s). 201910836304.4 filed in China, on Sep. 5, 2019, the entire contents of which are hereby incorporated by reference.

BACKGROUND OF THE INVENTION

Technical Field of the Invention

The invention relates to a fixing structure, more particularly to a fixing structure configured to fix at least one screw.

Description of the Related Art

Screws are common tool for fixing components in a server. An add-in device, such as a function expansion device, also requires screws so as to be installed in the server. For the purpose of convenience, the server usually contains spare screws at respective screw holes.

SUMMARY OF THE INVENTION

One embodiment of this invention provides a fixing structure, configured to fix a screw. The screw includes a wide portion and a narrow portion that are connected to each other. The fixing structure includes a plate part, a holding component and an elastic positioning component. The plate part includes a top surface, a bottom surface and a mount groove. The top surface faces away from the bottom surface. The mount groove penetrates through the top surface and the bottom surface and the narrow portion is configured to be disposed through the mount groove so as to allow the wide portion to rest on the top surface. The holding component protrudes from the top surface. The holding component and the top surface together form a space therebetween. The elastic positioning component is disposed on the plate part. When the wide portion is located in the space and located between the holding component and the top surface, and the elastic positioning component is in a holding state and located at a side of the wide portion, the wide portion is prevented from being moved away from the space. When the elastic positioning component is switched to a released state, the elastic positioning component is removed from the side of the wide portion so that the wide portion is allowed to move away from the space.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
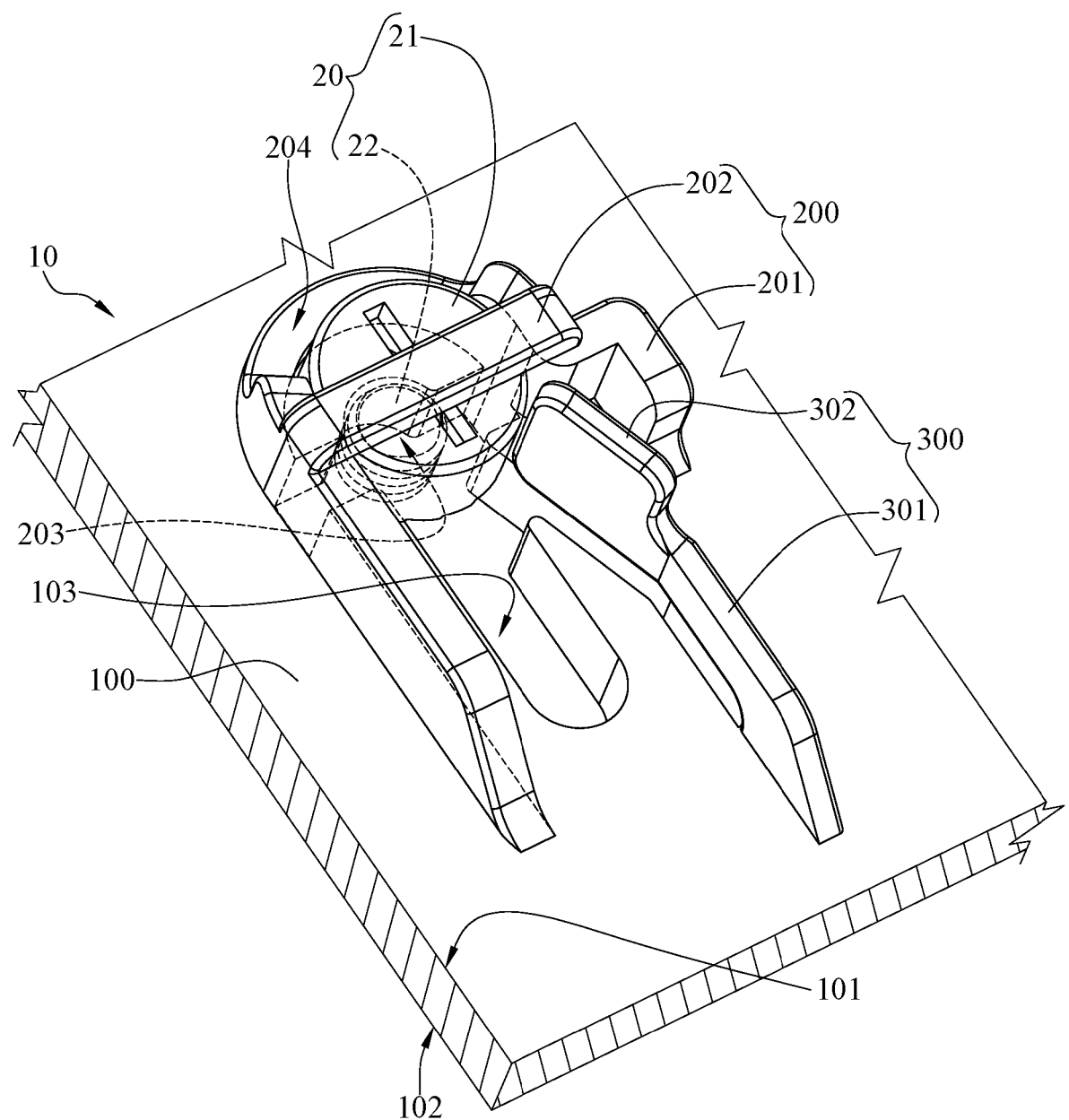
FIG. 1 is a perspective view showing a fixing structure according to one embodiment of the disclosure and a screw.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
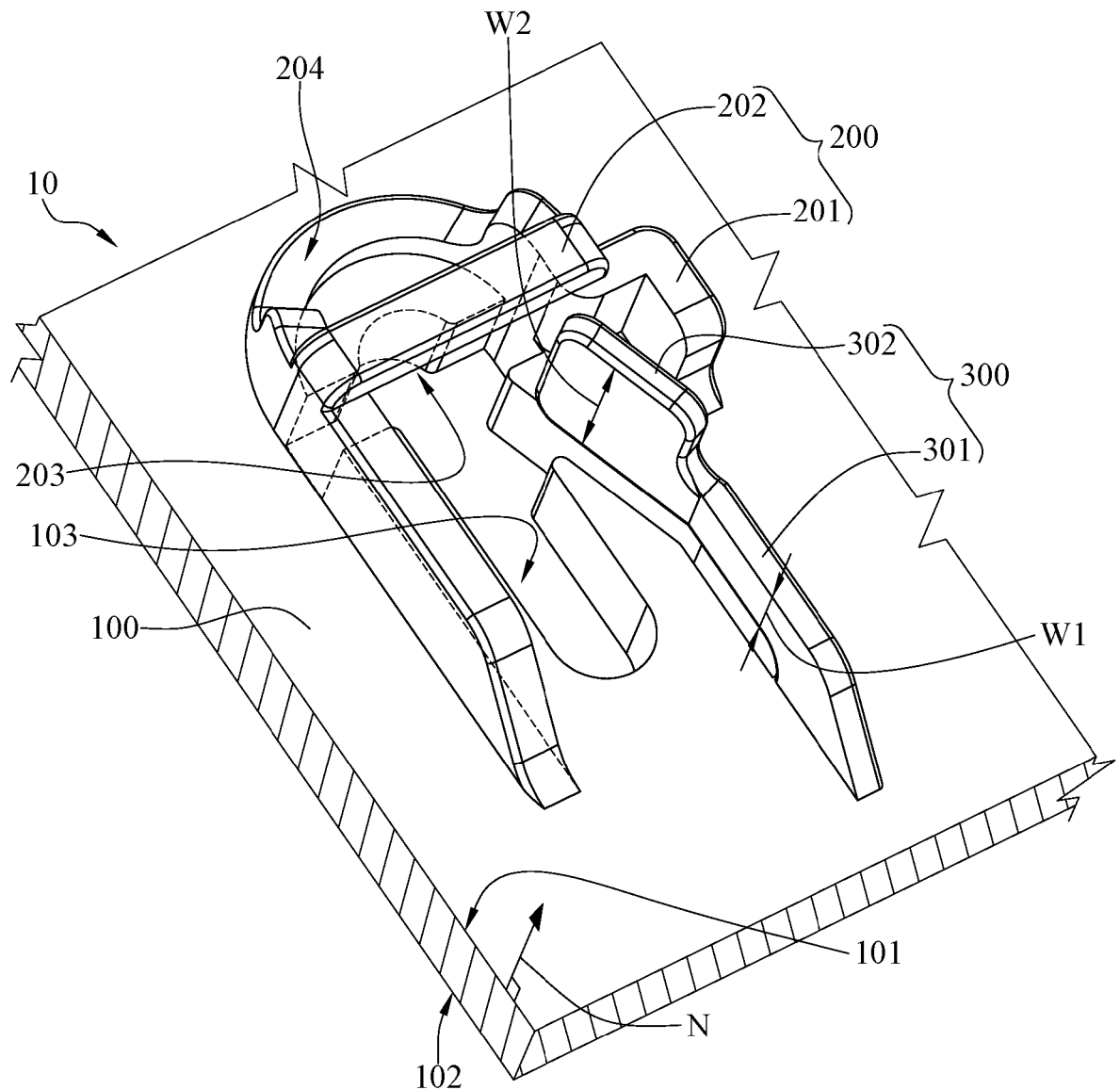
FIG. 2 is a perspective view of the fixing structure in FIG. 1.
Figure 3:
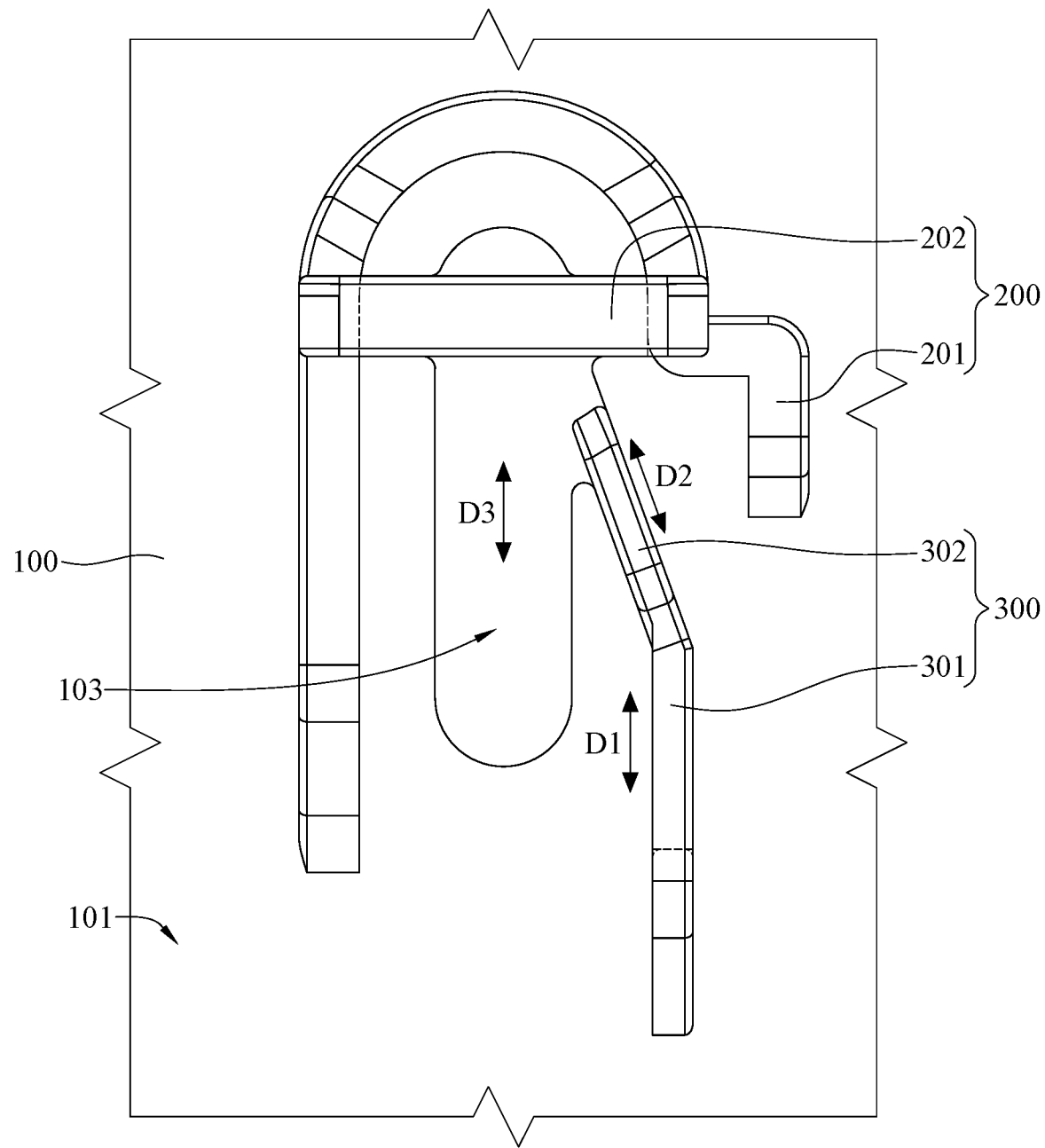
FIG. 3 is a top view of the fixing structure in FIG. 2.
Figure 4:
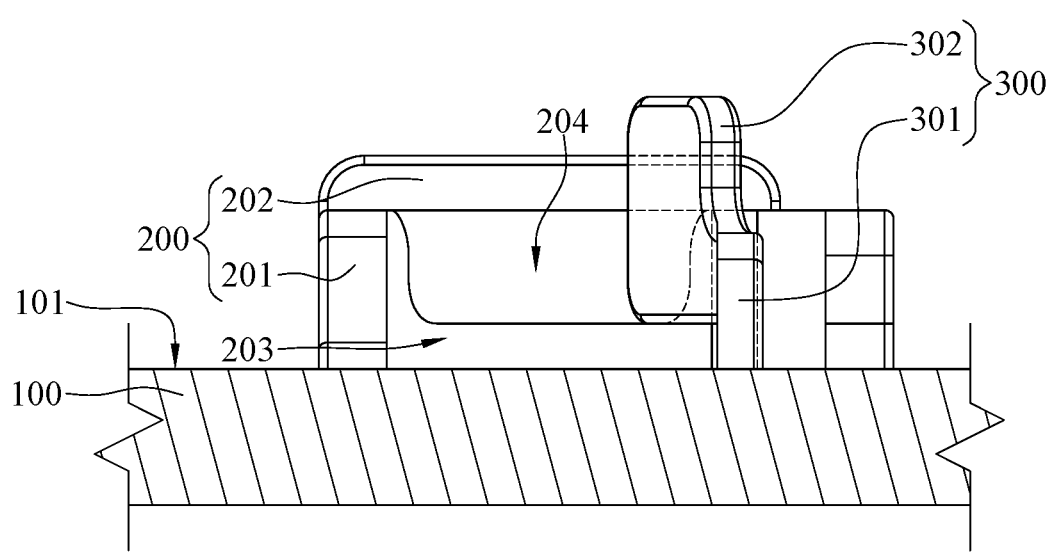
FIG. 4 is a rear view of the fixing structure in FIG. 2.

Please refer to FIG. 1 to FIG. 4, where FIG. 1 is a perspective view showing a fixing structure 10 according to one embodiment of the disclosure and a screw 20, FIG. 2 is a perspective view of the fixing structure 10 in FIG. 1, FIG. 3 is a top view of the fixing structure 10 in FIG. 2, and FIG. 4 is a rear view of the fixing structure 10 in FIG. 2.

In this embodiment, the fixing structure 10 is configured to fix or hold the screw 20 in position. The fixing structure 10 includes a plate part 100, a holding component 200 and an elastic positioning component 300.

The plate part 100 includes a top surface 101, a bottom surface 102 and a mount groove 103. The top surface 101 faces away from the bottom surface 102. The mount groove 103 penetrates through the top surface 101 and the bottom surface 102. In this embodiment, the plate part 100 is a part of, for example, a baffle, but the disclosure is not limited thereto. In other embodiments, the plate part may be a part of a server chassis.

In this embodiment, the holding component 200 includes a base part 201 and a stopper 202. The base part 201 protrudes from, for example, the top surface 101. The stopper 202 is disposed on a side of the base part 201 that is located away from the top surface 101 so that the stopper 202 and the top surface 101 together form a space 203 therebetween.

However, the base part 201 of the holding component 200 is not limited to protrude from the top surface 101. In other embodiments, the base part may protrude from the bottom surface of the plate part, or may protrude from a side surface of the plate part that is located between the bottom surface and the top surface. In such a case that the base part protrudes from the side surface of the plate part, the stopper is disposed on a side of the base part that is located away from the side surface and extends toward a side of the top surface that is located away from the bottom surface, such that the stopper and the top surface forms the space.

The elastic positioning component 300 is disposed on the plate part 100. In detail, the elastic positioning component 300 includes a first plate part 301 and a second plate part 302 that are connected to each other, the first plate part 301 is disposed on the top surface 101 of the plate part 100, and the first plate part 301 is spaced apart from the mount groove 103. The second plate part 302 extends toward the mount groove 103 from the first plate part 301. As shown in FIG. 3, the first plate part 301 extends in an extension direction D1, and the second plate part 302 extends in an extension direction D2 not parallel to the extension direction D1. In addition, the mount groove 103 extends in an extension direction D3 which is substantially parallel to the extension direction D1 of the first plate part 301. Further, as shown in FIG. 2, in a normal direction N of the top surface 101, the first plate part 301 has a width W1, and the second plate part 302 has a width W2 that is larger than the width W1.

However, the first plate part 301 is not limited to be disposed on the top surface 101 of the plate part 100. In other embodiments, the first plate part 301 may be disposed on the bottom surface 102 of the plate part 100. In such a case, the elastic positioning component 300 may further include a connection plate part, where the connection plate part connects the first plate part 301 and the second plate part 302 so that the plate part 100 is located between the first plate part 301 and the second plate part 302.

In addition, the extension direction D1 of the first plate part 301 is not limited to be non-parallel to the extension direction D2 of the second plate part 302. In other embodiments, the extension direction of the first plate part may be parallel to that of the second plate part. Further, in such a case, the extension directions of the first plate part and the second plate part is parallel to that of the mount groove, and the first plate part and the second plate part are spaced apart from the mount groove by the same distance.

Furthermore, the base part 201 includes a recess 204 formed at a side of the base part 201 that is located away from the top surface 101. The space 203 is located between the recess 204 and the elastic positioning component 300. Note that, in the other embodiments, the base part may not include the recess 204.

In this embodiment, the plate part 100, the holding component 200 and the elastic positioning component 300 are, for example, integrally formed into a single piece by plastic injection molding process, but the invention is not limited thereto. In other embodiment, the plate part, the holding component and the elastic positioning component may be three independent pieces being assembled together.

Figure 5:
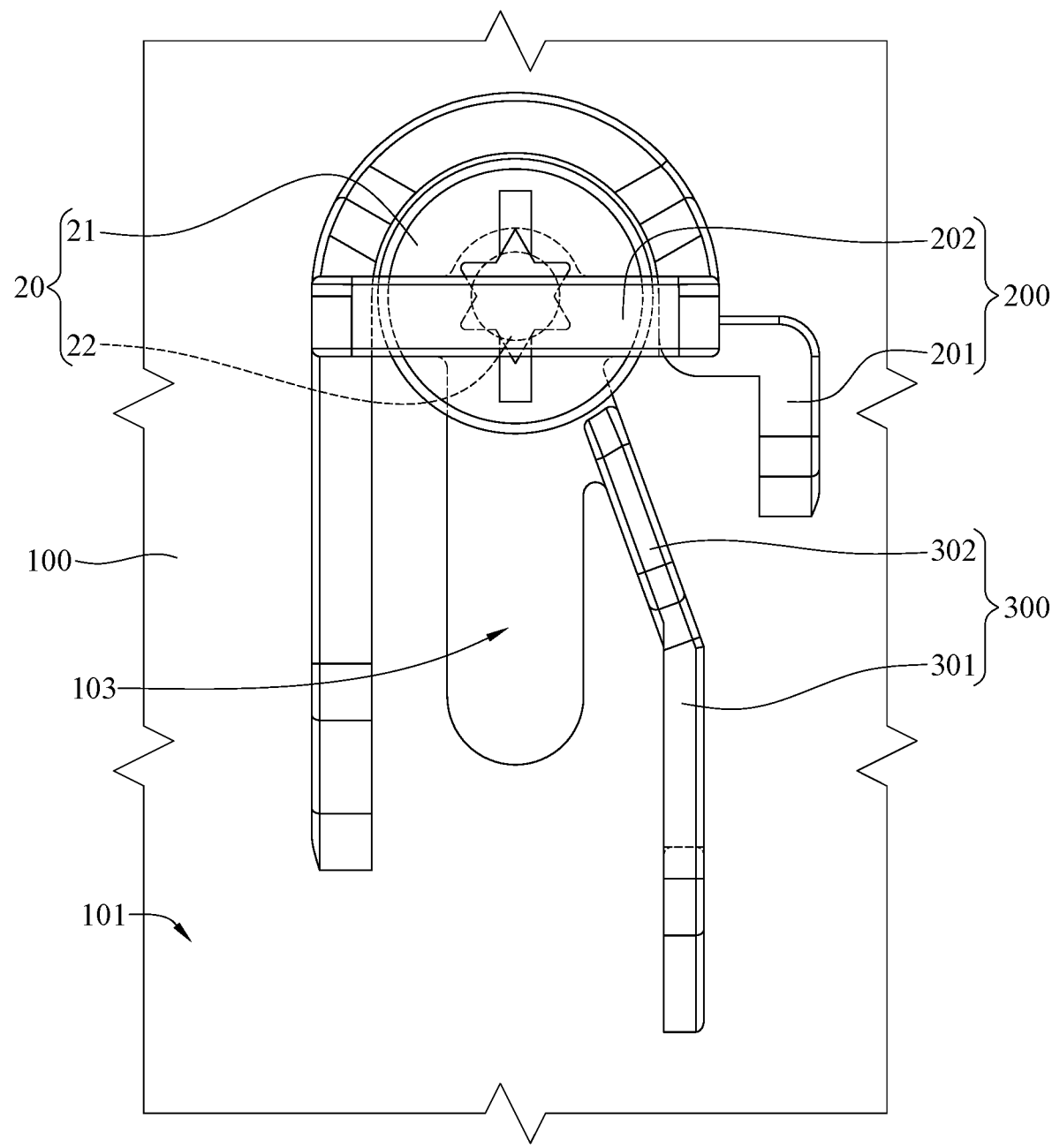
FIG. 5 is a top view of the fixing structure and the screw in FIG. 1.
Figure 6:
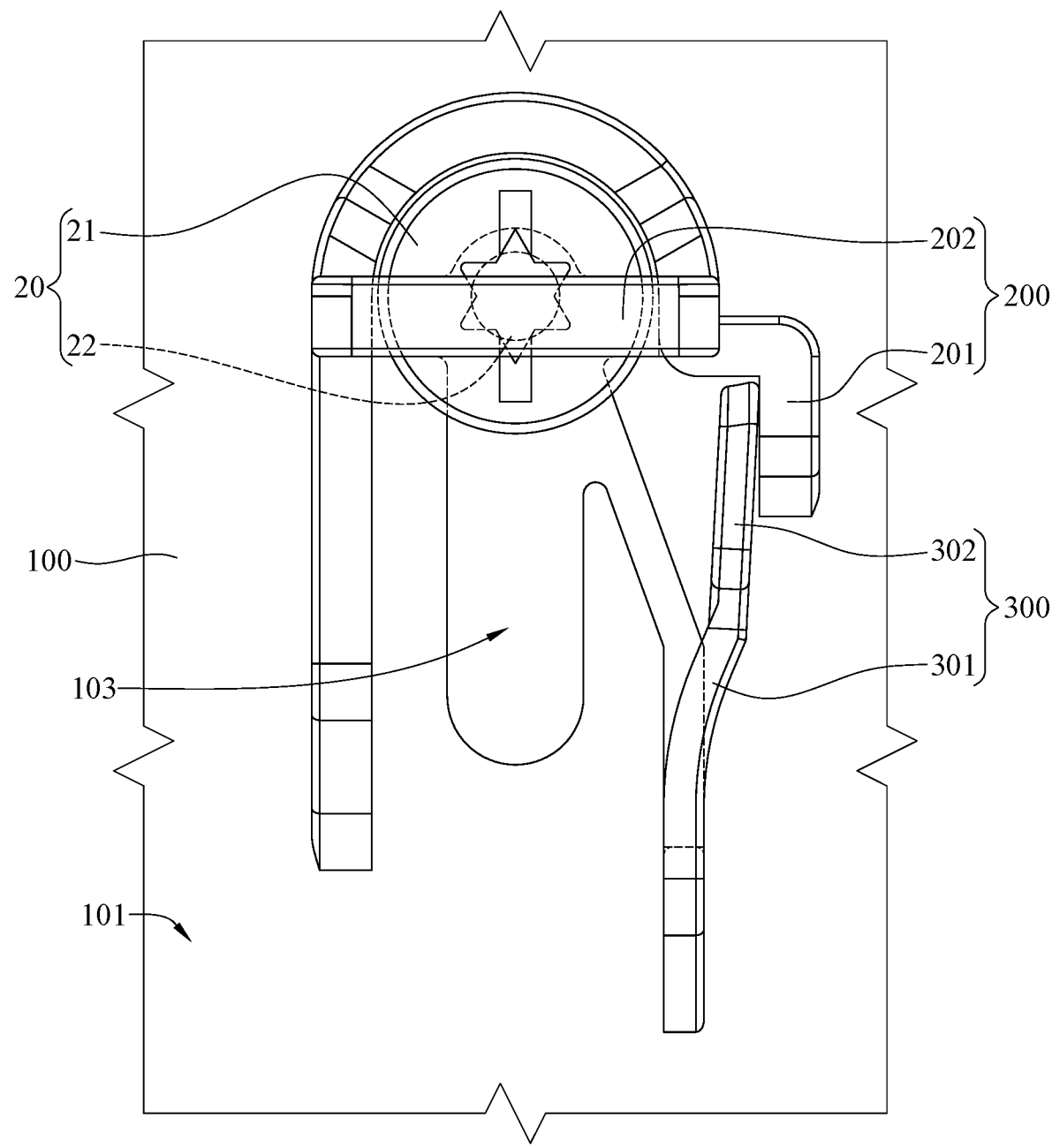
FIG. 6 is a top view of the fixing structure and the screw showing that a second plate part of an elastic positioning component is in a released state.
Figure 7:
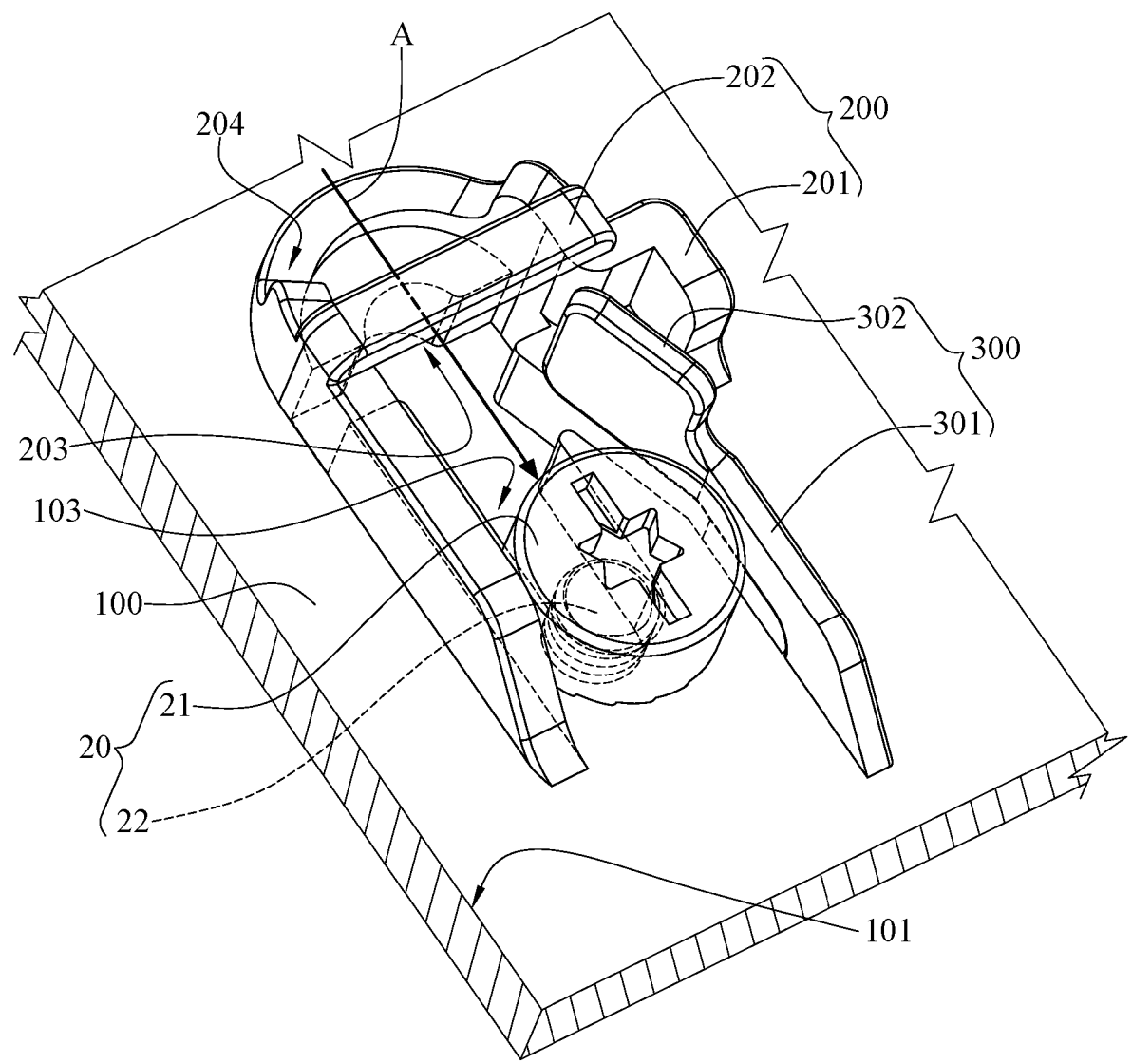
FIG. 7 is a perspective view of the fixing structure and the screw showing that the screw is moved away from the space.
Figure 8:
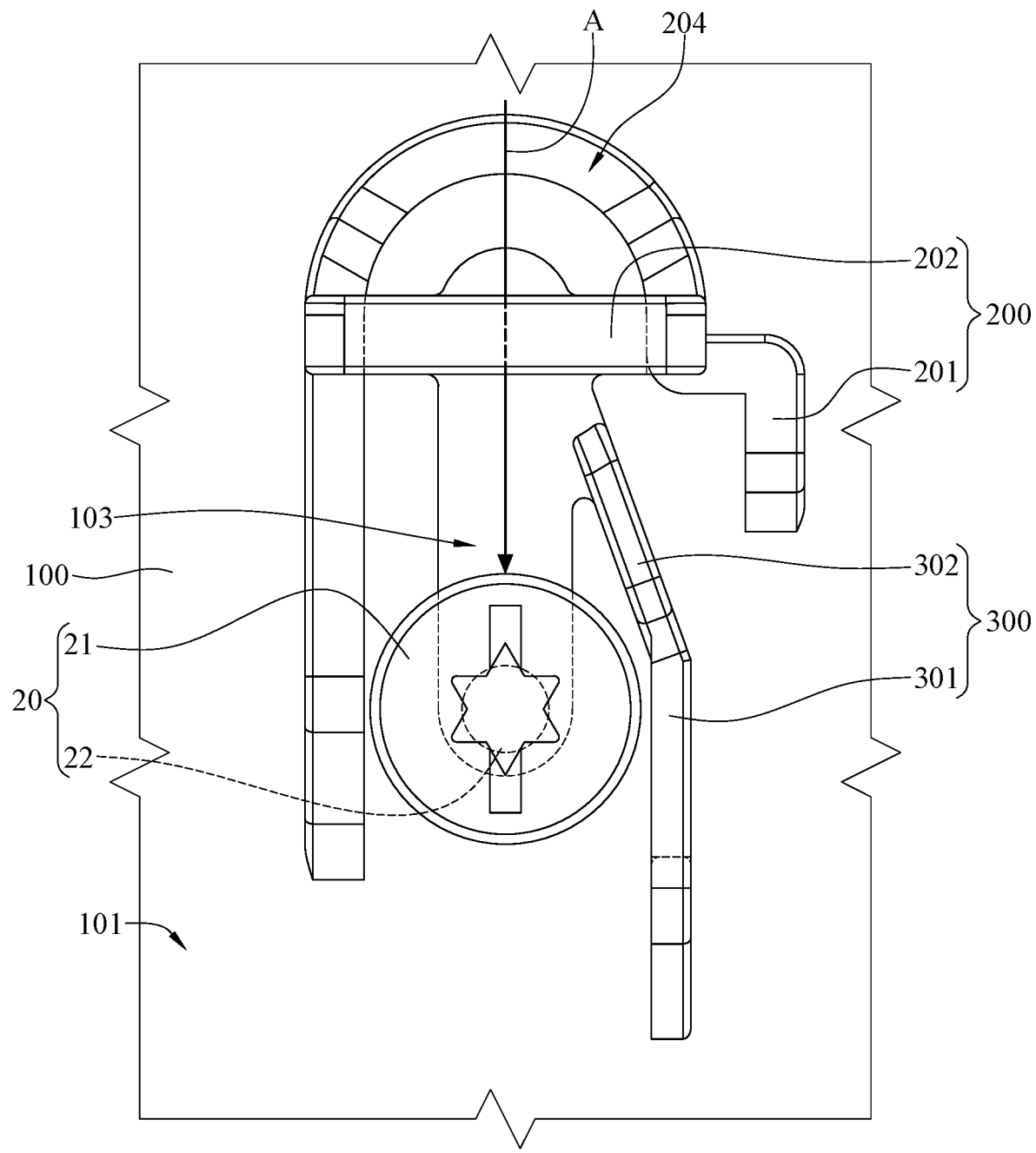
FIG. 8 is a top view of the fixing structure and the screw in FIG. 7.

The removal of the screw 20 from the fixing structure 10 is illustrated hereinafter. Referring to FIG. 1 and further referring to FIGS. 5-8, where FIG. 5 is a top view of the fixing structure 10 and the screw 20 in FIG. 1. FIG. 6 is a top view of the fixing structure 10 and the screw 20 showing that a second plate part 302 of an elastic positioning component 300 is in a released state. FIG. 7 is a perspective view of the fixing structure 10 and the screw 20 showing that the screw is moved away from the space. FIG. 8 is a top view of the fixing structure 10 and the screw 20 in FIG. 7.

The screw 20 includes a wide portion 21 and a narrow portion 22 that are connected to each other. The narrow portion 22 is configured to be disposed through the mount groove 103; and the wide portion 21 can rest on the top surface 101 of the plate part 100 when the narrow portion 22 is disposed through the mount groove 103.

As shown in FIG. 1 and FIG. 5, when the wide portion 21 is located in the space 203 and located between the stopper 202 of the holding component 200 and the top surface 101, and the second plate part 302 of the elastic positioning component 300 is in a holding state, the stopper 202 and the second plate part 302 are respectively located on different sides of the wide portion 21 so that the wide portion 21 is prevented from being moved away from the space 203. It is noted that the stopper 202 and the second plate part 302 may contact the screw 20 or may be spaced apart from the screw 20 by a negligible gap depending on actual size of the screw 20.

In order to remove the screw 20 from the fixing structure 10, first step is to move the second plate part 302 so that the elastic positioning component 300 is in the released state. By doing so, as shown in FIG. 6, the second plate part 302 is moved away from the wide portion 21, such that the wide portion 21 is allowed to be moved away from the space 203 by moving the narrow portion 22 in the mount groove 103 along a direction A. Note that the user is able to push the wide portion 21 out of the space 203 by applying force on the side of the wide portion 21 that is near the recess 204. As shown in FIG. 7 and FIG. 8, when the wide portion 21 leaves the space 203, the second plate part 302 can be released and springs back to its original position, and the wide portion 21 is not restricted by the stopper 202 of the holding component 200 and the elastic positioning component 300, such that the screw 20 is free to be removed from the fixing structure 10.

The width W2 of the second plate part 302 being larger than the width W1 of the first plate part 301 allows the user to easily push the second plate part 302, however, the invention is not limited to the widths of the second plate part 302 and the first plate part 301. In other embodiments, the width of the second plate part may be smaller than or equal to that of the first plate part; in such as case, the second plate part may be connected with an additional handle for the user to operate the second plate part.

Figure 9:
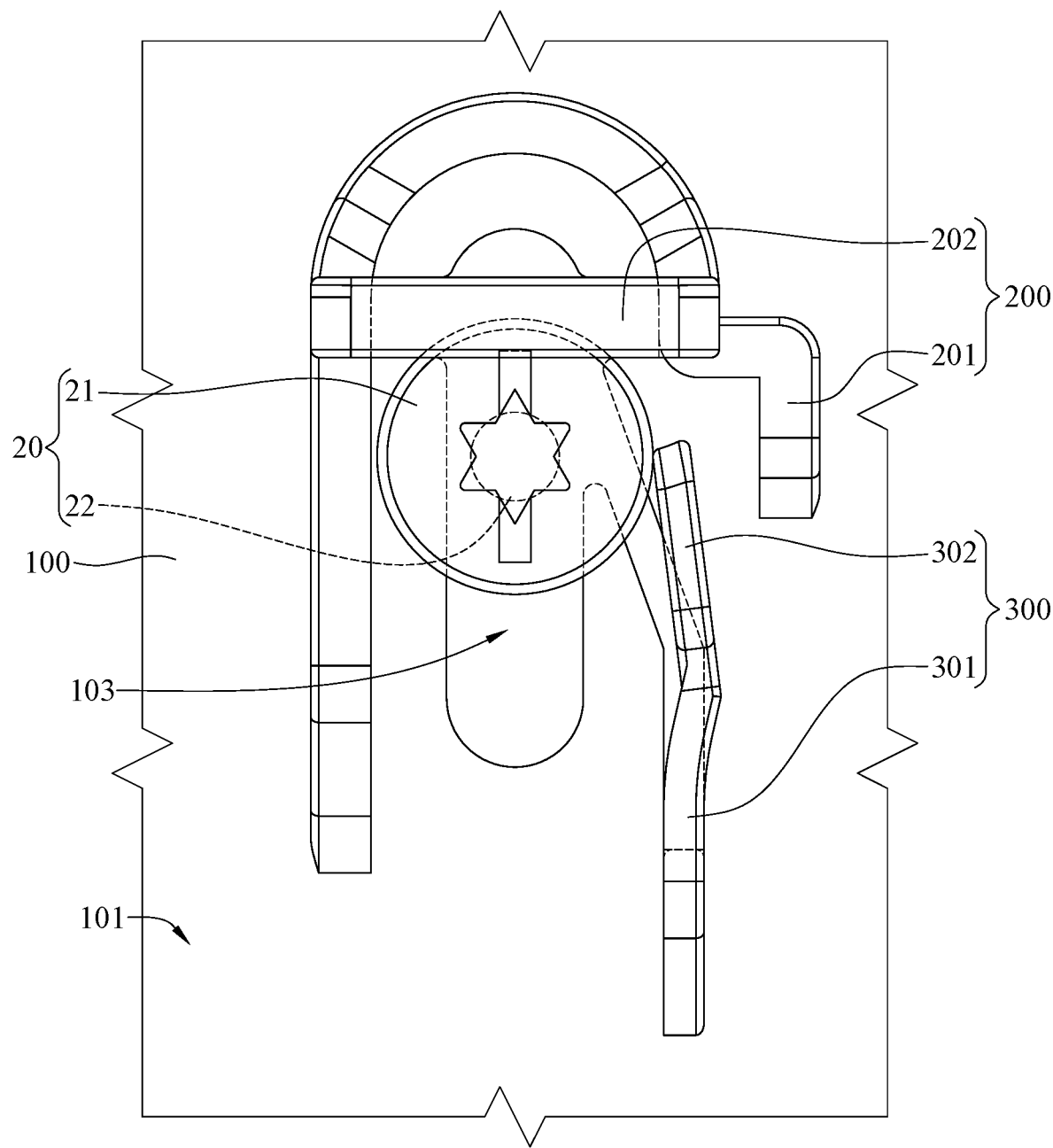
FIG. 9 is a top view of the fixing structure and the screw showing that the screw pushes the second plate part of the elastic positioning component.

Next, the placing of the screw 20 to the fixing structure 10 is illustrated hereinafter. Referring to FIG. 1 and FIG. 5 and further referring to FIG. 9, where FIG. 9 is a top view of the fixing structure 10 and the screw 20 showing that the screw 20 pushes the second plate part 302 of the elastic positioning component 300.

In order to install the screw 20 to the fixing structure 10, first step is to push the wide portion 21 along a direction that is opposite to the direction A shown in FIG. 7 and FIG. 8. By doing so, as shown in FIG. 9, the narrow portion 22 slides in the mount groove 103 and the wide portion 21 pushes the second plate part 302 of the elastic positioning component 300 away from the mount groove 103, thereby allowing the wide portion 21 to enter the space 203. Next, the wide portion 21 is further pushed along the direction that is opposite to the pushing direction A in FIG. 7 and FIG. 8 and thus enters the space 203. As shown in FIG. 1 and FIG. 5, when the wide portion 21 is located in the space, the second plate part 302 can be released and springs back to its original position, and the stopper 202 and the second plate part 302 are respectively located on different sides of the wide portion 21, thereby preventing the wide portion 21 from being moving away from the space 203 and thus the installation of the screw 20 to the fixing structure 10 is completed.

According to the fixing structure 10 discussed above, the holding component 200 protrudes from the top surface 101 so that the holding component 200 and the top surface 101 together form the space 203 therebetween, and the elastic positioning component 300 is allowed to be switched between the holding state and the released state. Therefore, when the wide portion 21 is located in the space 203 and the elastic positioning component 300 is in the holding state, the holding component 200 and the elastic positioning component 300 are respectively located on different sides of the wide portion 21, such that the wide portion 21 is prevented from being moved away from the space 203. In addition, when the elastic positioning component 300 is in the released state, the elastic positioning component 300 is removed from the side of the wide portion 21 so that the wide portion 21 is allowed to be moved away from the space 203 and thus being free to be removed from the fixing structure 10. Thus, the screw 20 is allowed to be detached from or installed on the fixing structure 10 merely by two hands, thereby allowing the screw 20 to be place to or remove from the fixing structure 10 in a convenient and cost-effective manner.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A fixing structure, configured to fix a screw, the screw comprising a wide portion and a narrow portion that are connected to each other, the fixing structure comprising:
    a plate part, comprising a top surface, a bottom surface and a mount groove, wherein the top surface faces away from the bottom surface, the mount groove penetrates through the top surface and the bottom surface and the narrow portion is configured to be disposed through the mount groove so as to allow the wide portion to rest on the top surface;
    a holding component, protruding from the top surface, wherein the holding component and the top surface together form a space therebetween; and
    an elastic positioning component, disposed on the plate part, wherein the elastic positioning component comprises a first plate part and a second plate part that are connected to each other, the first plate part extends in a first extension direction, the second plate part extends in a second extension direction, the mount groove extends in a third extension direction, the first extension direction and the third extension direction are parallel to each other, the first extension direction and the second extension direction are not parallel to each other, the first plate part is spaced apart from the mount groove, and the second plate part extends toward the mount groove;
    wherein, when the wide portion is located in the space and located between the holding component and the top surface, and the elastic positioning component is in a holding state and located at a side of the wide portion, the wide portion is prevented from being moved away from the space; when the elastic positioning component is switched to a released state, the elastic positioning component is removed from the side of the wide portion so that the wide portion is allowed to move away from the space.

2. The fixing structure according to claim 1, wherein the holding component comprises a base part and a stopper, the base part protrudes from the top surface of the plate part, the stopper is disposed on a side of the base part that is located away from the top surface so that the stopper and the top surface together form the space therebetween.

3. The fixing structure according to claim 2, wherein the base part comprises a recess, the recess formed at the side of the base part that is located away from the top surface and the space is located between the recess and the elastic positioning component.

4. The fixing structure according to claim 2 wherein when the elastic positioning component is in the released state, the second plate part of the elastic positioning component is moved toward the base part and restricted by the base part.

5. The fixing structure according to claim 1, wherein the plate part, the holding component and the elastic positioning component are integrally formed into a single piece.

6. The fixing structure according to claim 5, wherein the plate part, the holding component and the elastic positioning component are integrally formed into a single piece by plastic injection molding process.

7. The fixing structure according to claim 1, wherein the elastic positioning component is disposed on the top surface of the plate part.

8. The fixing structure according to claim 1, wherein in a normal direction of the top surface, a width of the second plate part is larger than a width of the first plate part.

9. The fixing structure according to claim 1, wherein the first plate part and the mount groove respectively extend in extension directions that are substantially parallel to each other.

10. The fixing structure according to claim 1, wherein the first plate part has a first width in a normal direction of the top surface, the second plate part has a second width in the normal direction of the top surface, and the second width is larger than the first width.

* * * * *